US 11,395,128 B2

United States Patent
Ganji et al.

(10) Patent No.: US 11,395,128 B2
(45) Date of Patent: Jul. 19, 2022

(54) METHOD OF NETWORK-BASED STEERING OF A MOBILE DEVICE POSITIONED IN AN AREA HAVING PREFERRED AND NON-PREFERRED OVERLAPPING NETWORK COVERAGE

(71) Applicant: Syniverse Technologies, LLC, Tampa, FL (US)

(72) Inventors: Sreenivasa Ganji, Tampa, FL (US); Huiyue Xu, Tampa, FL (US); Zidan Lian, San Jose, CA (US); Thiagu Somasundaram, Wesley Chapel, FL (US); Deliang Qian, Tampa, FL (US); Edward Yau, Tseung Kwan O (HK)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 17/389,606

(22) Filed: Jul. 30, 2021

(65) Prior Publication Data

US 2022/0038886 A1    Feb. 3, 2022

Related U.S. Application Data

(60) Provisional application No. 63/059,632, filed on Jul. 31, 2020.

(51) Int. Cl.
*H04W 8/12* (2009.01)
*H04W 8/08* (2009.01)
(Continued)

(52) U.S. Cl.
CPC ............. *H04W 8/12* (2013.01); *H04W 8/082* (2013.01); *H04W 48/16* (2013.01); *H04W 48/18* (2013.01); *H04W 84/042* (2013.01)

(58) Field of Classification Search
CPC ....... H04W 8/12; H04W 8/082; H04W 48/16; H04W 48/18; H04W 84/042
(Continued)

(56) References Cited

U.S. PATENT DOCUMENTS

| 2004/0259546 A1 | 12/2004 | Balachandran et al. |
| 2006/0035636 A1 | 2/2006 | Pirila |

(Continued)

FOREIGN PATENT DOCUMENTS

| EP | 1887820 A1 | 2/2008 |
| EP | 2200376 A1 | 6/2010 |
| EP | 2641410 B1 | 7/2020 |

OTHER PUBLICATIONS

Discussion on Proximity Indication of NPN, Huawei, Agenda Item 11.18, 3GPP TSG-RAN WG2 Meeting#107, Prague, Czech Republic Aug. 26-30, 2019.
(Continued)

*Primary Examiner* — Chuck Huynh
(74) *Attorney, Agent, or Firm* — Andriy Lytvyn; Smith & Hopen, P.A.

(57) ABSTRACT

A method for steering a mobile device to a preferred network, such as a Private LTE network or a 5G network, in a scenario in which the coverage area of the preferred network overlaps the coverage area of a non-preferred network. A preferred network list is provisioned into a SIM/eSIM module at the mobile device side. The steering application is hosted at the home network and periodically triggers the home network to request from the visited network a set of values for attributes associated with a current location of the mobile device. Based on these values, the steering application determines whether the mobile device is within the coverage area of the preferred network and, if so, directs the home network to send a cancel location
(Continued)

request to the non-preferred visited network, thereby triggering the mobile device to attach to the preferred network.

18 Claims, 15 Drawing Sheets

(51) Int. Cl.
*H04W 48/16* (2009.01)
*H04W 48/18* (2009.01)
*H04W 84/04* (2009.01)

(58) Field of Classification Search
USPC .......................................................... 370/329
See application file for complete search history.

(56) References Cited

U.S. PATENT DOCUMENTS

| | | |
|---|---|---|
| 2006/0135160 A1* | 6/2006 | Jiang ........................ H04W 8/04 455/435.1 |
| 2008/0020756 A1 | 1/2008 | Jiang |
| 2008/0108347 A1 | 5/2008 | Jiang |
| 2010/0197320 A1 | 8/2010 | Ulrich et al. |
| 2011/0281582 A1 | 11/2011 | Jiang |
| 2012/0157092 A1 | 6/2012 | Agretti et al. |

OTHER PUBLICATIONS

Extended European Search Report dated Jan. 4, 2022 for corresponding European Patent Application No. 21188978.7 filed Jul. 31, 2021.

* cited by examiner

Exemplary IDR-Flags field value of
Insert Subscriber Data Request (IDR)

Exemplary EPS-Location-Information field value of
Insert Subscriber Data Answer (IDA)

FIG. 2

| Column Name | Description |
|---|---|
| cell_radio | Radio type of the device, e.g. 'gsm', 'cdma', 'umts', 'lte' and 'nbiot'. |
| cell_mcc | Mobile Country Code |
| cell_mnc | Mobile Network Code |
| cell_area | LAC/TAC |
| cell | Cell ID |
| cell_unit | |
| cell_lon | The longitude representing the location |
| cell_lat | The latitude representing the location |
| cell_range | Cell Coverage Range |
| averagesignal | |
| Country | |
| State | |
| City | |
| Address | |
| Updated time | |

FIG. 4

METHOD OF NETWORK-BASED STEERING OF A MOBILE DEVICE POSITIONED IN AN AREA HAVING PREFERRED AND NON-PREFERRED OVERLAPPING NETWORK COVERAGE

PRIORITY CLAIM

This non-provisional patent application claims priority to a U.S. Provisional Application No. 63/059,632 filed on Jul. 31, 2020.

BACKGROUND OF THE INVENTION

1. Field of the Invention

This invention relates generally to the field of telecommunication networks. More specifically, the invention pertains to a method for improving mobile network steering and traffic routing efficiency, such that a mobile device is steered to a preferred network in scenarios in which coverage area of a preferred Private LTE or 5G network overlaps coverage area of one or more non-preferred Public Land Mobile Networks (PLMN), including 3G, 4G and 5G networks.

2. Brief Description of the Related Art

Private Long Term Evolution (LTE) networks are emerging as a new type of telecommunication networks. Private LTE can be specifically configured to serve specific enterprises, including those in government and educational sectors. Although Private LTE networks use established standards for LTE networks, unlike Public Land Mobile Networks (PLMNS), which are operated by traditional mobile operators within license spectrum, Private LTE networks can be operated by third-party network providers using licensed, unlicensed, or shared spectrum. Moreover, Private LTE networks can be accessed only by specific mobile devices (such as an Internet of Things (IoT) device, a restricted employee device, etc.) for predefined business purposes. A Private LTE network can be isolated from the public network access and can be tailored for optimized network performance and increased secure control, independence, and flexibility. For these reasons, Private LTE networks have a wide array of potential applications, including enterprise connectivity, Industrial IoT, Smart City, Smart Transportation, etc.

Unlike PLMNs that can provide seamless and full coverage over a metropolitan or a wide geographic area, coverage areas of typical Private LTE networks are generally limited and often overlap with the geographic areas covered by one or more PLMNs. Along with the growth of the Private LTE networks and deployment of Citizens Broadband Radio Service (CBRS), overlapping Private LTE networks covering the same geographic area will become increasingly possible. This problem presents a challenge for ensuring that moving mobile devices automatically register and use the preferred cellular network and service. Multiple cellular networks serving the same location generally retain their own mobility management for security reasons.

Currently, to register within a PLMN, a mobile device scans for available networks in its geographic area. Once mobile device identifies and registers with a PLMN, the mobile device will not attempt to register with another cellular network unless one of the following conditions occurs: (1) loss of the current network connection, (2) the user manually initiates a new network search/selection process, or (3) the mobile device attempts to search/select a higher priority cellular network upon expiration of a predefined time period. Thus, generally, a mobile device registered with a PLMN will not become aware that a new cellular network with higher priority becomes available until the predefined time period expires, and, therefore, the mobile device may wait for an extensive period of time before switching to a more preferred cellular network.

Unlike traditional mobile networks, which generally have extensive coverage over wide geographic areas, Private LTE networks are usually restricted to predefined locations, which may overlap with coverage areas of other mobile networks. This scheme generally works well for stationary mobile devices that can always be inside the coverage of the specific Private LTE network. However, providing seamless network connectivity for a mobile device that moves across multiple Private LTE networks and PLMNs creates a challenge. For example, when a mobile device moves from a geographic location covered exclusively by a PLMN into a geographic location covered by both the PLMN and a Private LTE network (as depicted in FIGS. 1A-1C), it is desirable for the mobile device to quickly and efficiently connect to the Private LTE network. However, as explained above, because the mobile device is already connected to a PLMN, a mobile device will not automatically switch from the PLMN to the Private LTE network until one of the following events occurs: the mobile device is outside of the public network coverage area, the user manually initiates registration with the Private LTE network, or a predefined time elapses.

Similar challenges are also pertinent to the emerging 5G networks. Because these networks are at the early deployment stages, 5G coverage is limited and often overlaps with the coverage areas of 3G and 4G networks. Thus, when a 5G-capable device moves into a geographic location having 5G network coverage, the 5G-capable device may remain connected to the 3G or 4G network and may fail to switch to the 5G network in a quick and efficient manner.

Thus, there exists an unresolved need for a method for improved mobile network steering and traffic routing efficiency by steering a mobile device to the preferred network in geographic locations concurrently covered by multiple networks including Private LTE networks/5G networks and Public Land Mobile Networks, such as 3G and 4G networks.

SUMMARY OF THE INVENTION

The invention provides a novel and non-obvious solution to the problem identified above. Instead of relying on the device-side process of conducting periodical network scanning, which is interruptive and power consuming, the invention provides a network-side solution that steers the mobile device to the preferred network based on the proximity of the mobile device to the preferred network.

In an embodiment, the invention pertains to a method of steering a mobile device to a preferred telecommunications network—for example, a 5G network, a private 5G network, or a private Long-Term Evolution (LTE) network—having a geographical coverage area overlapping with a coverage area of a non-preferred Visited Public Land Mobile Network (VPLMN), to which the mobile device is initially attached. A steering application is hosted on the home-network side and triggers the home network to send a first message to the non-preferred VPLMN, requesting a current location of the mobile device. The non-preferred VPLMN responds with a first response, which includes a set of values for attributes associated with the current location of the mobile device.

These values may include the following: a longitude, a latitude, a mobile country code (MCC), a mobile network code (MNC), a cell identification, an adjacent cell information, a radio signal quality, and a radio signal strength The steering application accesses a set of prestored attribute values defining the geographical coverage area of the preferred network and compares the set of attribute values received from the non-preferred VPLMN against the set of prestored attribute values to determine whether the current location of the mobile device is within the geographical coverage area of the preferred telecommunications network.

If the steering application determines that the current location of the mobile device is within the geographical coverage area of the preferred telecommunications network, then the steering application will trigger the home network to send a first command to the non-preferred VPLMN, wherein the first command directs the non-preferred VPLMN to discontinue attachment of the mobile device. When the mobile device becomes detached from the non-preferred VPLMN, the mobile device is configured to perform a network selection procedure, thereby requesting to attach to the preferred telecommunication network.

In an embodiment, the home network can be a 3G network, an LTE network, or a 5G network. Depending on the type of home network, the steering application can be configured to interface with a network node selected from a group consisting of a Home Location Register (HLR), a Home Subscriber Server (HSS), or a Unified Data Management (UDM) node.

In an embodiment, the home network requests the attribute values associated with the current location of the mobile device by sending an Insert Subscriber Data Request (IDR) message, a Provide Subscriber Information request message, or a Namf_Location Service message to the non-preferred VPLMN. In an embodiment, the command directing the VPLMN to detach the mobile device from its network can be sent as a Mobile Application Part (MAP) Cancel-Location message, a Diameter Cancel-Location-Request, or a Nudm Deregistration Notification message.

If, based on the attribute values received from the non-preferred VPLMN, the steering application determines that the current location of the mobile device is outside the coverage area of the preferred telecommunications network, the steering application can be configured to calculate an expected time of arrival at which the mobile device is projected to arrive into the geographical coverage area of the preferred telecommunications network. The steering application can then set a timer to send a second message to the non-preferred VPLMN requesting the updated attribute values associated with the new location of the mobile device at the expected time of arrival. The set of attribute values associated with the current location of the mobile device can be received via a Signaling System No. 7 (SS7) protocol, a Diameter protocol, a General Packet Radio Service Tunneling Protocol (GTP), a Hypertext Transfer Protocol/2 (HTTP/2), or Transmission Control Protocol/Internet Protocol (TCP/IP).

In an embodiment, the mobile device can be provisioned with a list of preferred telecommunications networks, such that when the mobile device becomes detached from the non-preferred VPLMN, the mobile device will perform a network selection procedure based on the list of preferred telecommunications networks.

BRIEF DESCRIPTION OF THE DRAWINGS

For a fuller understanding of the invention, reference should be made to the following detailed disclosure, taken in connection with the accompanying drawings, in which:

FIG. 2 is a diagram depicting an exemplary Insert Subscriber Data Request (IDR) with an EPS-Location-Information flag and an Insert Subscriber Data Answer (IDA) message.

FIG. 4 is a data model of the Cell-ID database records that can be used to determine the location of the mobile device.

DETAILED DESCRIPTION OF THE PREFERRED EMBODIMENT

Embodiments of the present invention pertain to a method and a system for improving mobile network steering and traffic routing efficiency in geographic locations where the coverage area of a Private Long-Term-Evolution (LTE) network/5G network overlaps the coverage area of a Public Land Mobile Network (PLMN), such a 3G or 4G network.

Figure 1A:
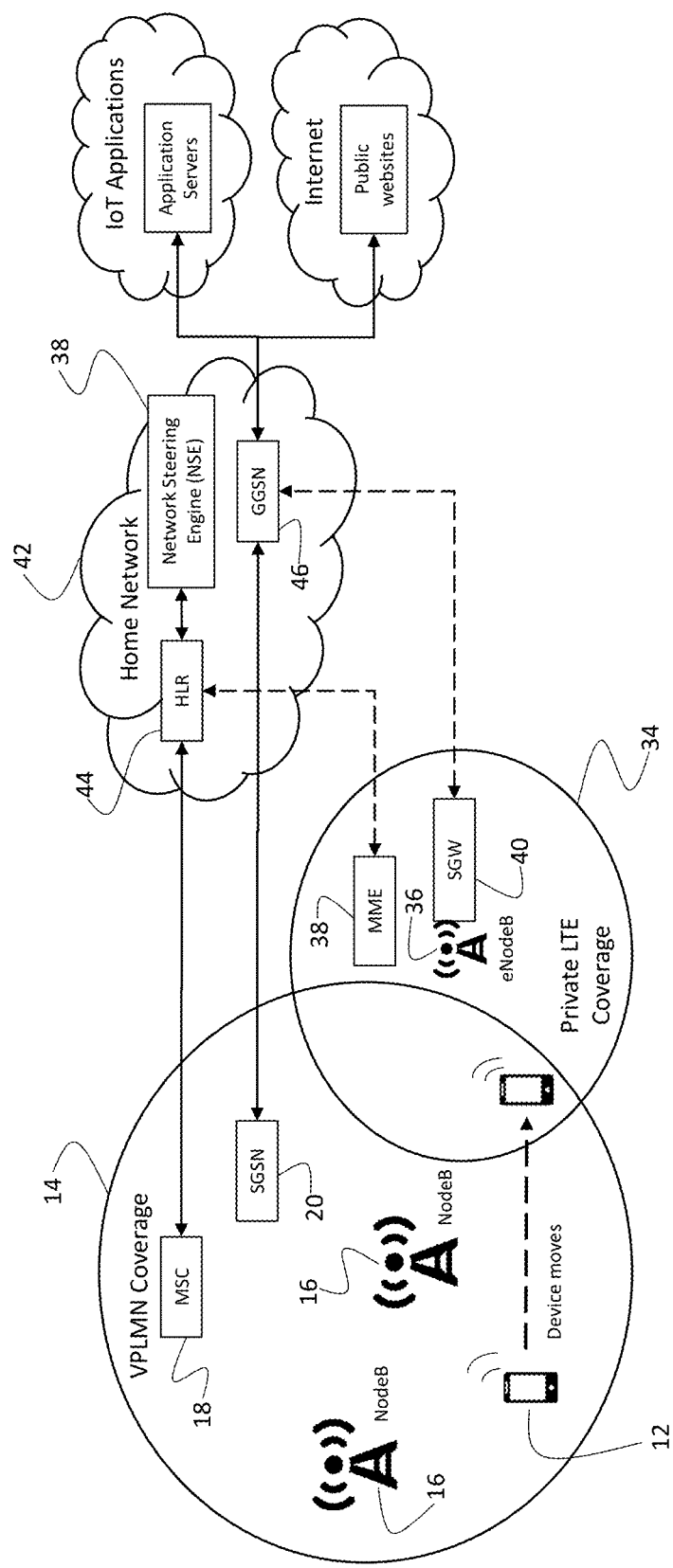
FIG. 1A is a block diagram schematically depicting an exemplary network architecture for a scenario in which the non-preferred network is a 3G network, the preferred network is a Private LTE network, and the home network is a 3G network.
Figure 1B:
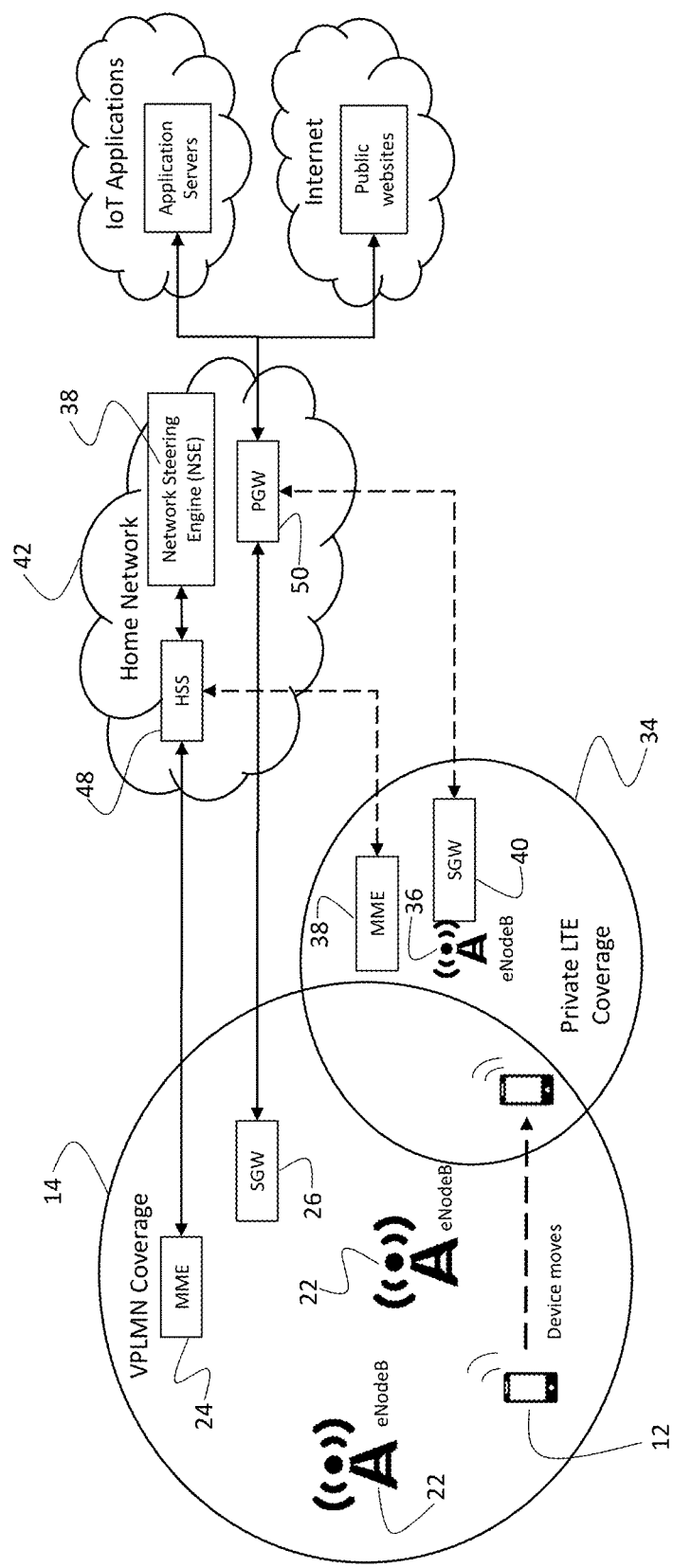
FIG. 1B is a block diagram schematically depicting an exemplary network architecture for a scenario in which the non-preferred network is an LTE network, the preferred network is a Private LTE network, and the home network is an LTE network.
Figure 1C:
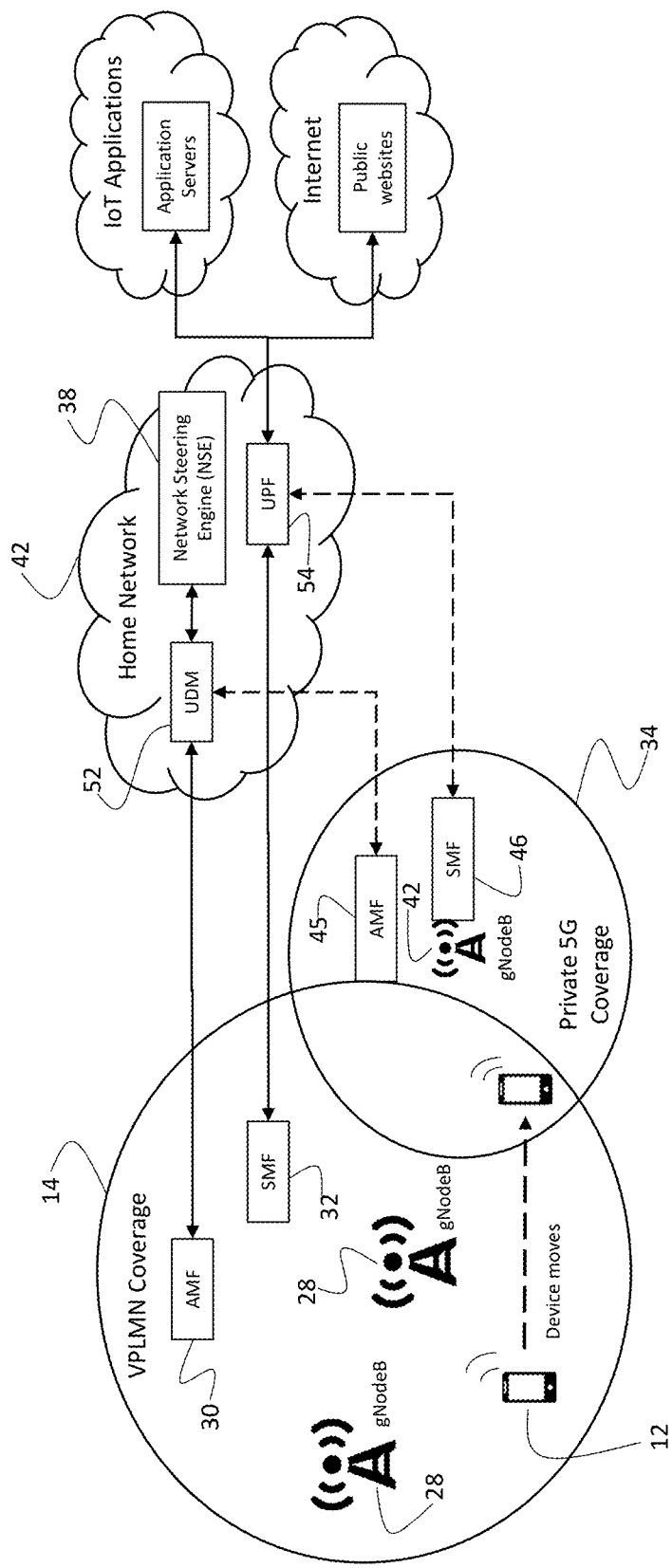
FIG. 1C is a block diagram schematically depicting an exemplary network architecture for a scenario in which the non-preferred network is a 5G network, the preferred network is a Private 5G network, and the home network is a 5G network.

FIGS. 1A-1C depict scenarios in which a mobile device 12 is initially positioned in a first geographic area in which only a non-preferred Visited Public Land Mobile Network (VPLMN) 14 has coverage. Thus, initially, mobile device 12 is attached to non-preferred VPLMN 14. FIG. 1A depicts a scenario in which VPLMN 14 is a 3G network. VPLMN 14 has at least the following nodes: NodeB 16, a Mobile Switching Center (MSC) 18, and a Serving General Packet Radio Service (GPRS) Support Node (SGSN) 20. FIG. 1B depicts a scenario in which VPLMN 14 is an LTE network. In this scenario, instead of NodeB 16, MSC 18 and SGSN 20, VPLMN 14 has the following nodes: evolved-NodeB (eNodeB) 22, a Mobility Management Entity (MME) 24 and Serving Gateway (SGW) 26, respectively. Next, FIG. 1C depicts a scenario in which VPLMN 14 is a 5G network. In this scenario, VPLMN 14 has the following nodes: gNodeB 28, AMF 30, and SMF 32. Other types of mobile networks also fall within the scope of this invention.

FIGS. 1A-1C depict that mobile device 12 changes its location from a first geographic area covered exclusively by a non-preferred VPLMN 14 to a second geographic area in which both VPLMN 14 and a preferred mobile network 34 have overlapping coverage. FIGS. 1A and 1B depict scenarios in which preferred mobile network 34 is a Private LTE network. FIGS. 1A and 1B depict that the Private LTE Network has the following nodes: eNodeB 36, MME 38, and SGW 40. Next, FIG. 1C depicts a scenario in which preferred mobile network 34 is a Private 5G network, having the following nodes gNodeB 42, AMF 45, and SMF 46. These scenarios are exemplary and the principles of the present invention disclosed herein can be used to steer mobile device 12 from any non-preferred VPLMN 14 to any preferred mobile network 34, when mobile device 12 enters a location in which both non-preferred VPLMN 14 and preferred mobile network 34 have coverage.

Continuing reference to FIGS. 1A-1C, mobile device 12 is a subscriber of Home Network 42. In the exemplary scenario depicted in FIG. 1A, Home Network 42 is a 3G network, having the following nodes: Home Location Register (HLR) 44 and Gateway GPRS Support Node (GGSN) 46. When mobile device 12 is attached to VPLMN 14, HLR 44 is communicatively coupled to MSC 18 and GGSN 46 is communicatively coupled to SGW 20. FIG. 1B depicts the scenario in which Home Network 42 is an LTE network, having the following nodes: Home Subscriber Server (HSS) 48 and Packet Gateway (PGW) 50. In this scenario, HSS 48 is communicatively coupled to MME 24 and PGW 50 is communicatively coupled to SGW 26. In the exemplary scenario depicted in FIG. 1C, Home Network 42 is a 5G network, having the following nodes: Unified Data Management (UDM) 52 and User Plane Function (UPF) 54. In this scenario, UDM 52 is communicatively coupled with AMF 30, and UPF 52 is communicatively coupled to SMF 32 of VPLMN 14.

FIG. 1A-1C further depict a steering application—referred to herein as a Network Steering Engine (NSE) 54—deployed in Home Network 42. FIGS. 1A-1C depict that NSE 54 is configured to communicate with HLR 44/HSS 48/UDM 52. NSE 54 runs on the home network side and interfaces with HLR 44/HSS 48/UDM 52 to periodically query the current Cell-ID from MSC 18/MME 24/AMF 30 of VPLMN 14. In an embodiment, NSE 54 maintains information pertaining to overlapping coverage areas of non-preferred VPLMN 14 and preferred network 34 to optimize the query frequency for current Cell-ID. Additionally, NSE 54 can be configured to calculate distances between a current location of mobile device 12 and locations in which preferred network 34 has coverage. NSE 54 can be further configured to detect or predict when mobile device 12 will arrive into a coverage area of preferred network 34.

After NSE 54 determines that mobile device 12 is located within the geographic area having preferred network 34 coverage, NSE 54 triggers HLR 44/HSS 48/UDM 52 to send a command to MSC 18/MME 24/AMF 30 of VPLMN 14 to discontinue attachment of mobile device 12 to VPLMN 14. In response to this command, non-preferred VPLMN 14 detaches mobile device 12 from its network. This detachment causes mobile device 12 to perform a network selection procedure based on a predefined list of preferred networks, which can be provisioned on a Subscriber Identity Module (SIM) card or a virtual SIM module (eSIM). Mobile device 12 will then trigger the attach procedure to a preferred network 34. As explained in more detail below, a protection technique can be implemented to avoid out-of-service scenario, if mobile device 12 continues to attach to the same non-preferred VPLMN 14.

To obtain a current location of mobile device 12, NSE 54 triggers HLR 44/HSS 48/UDM 52 of Home Network 42 to send a message to MSC 18/MME 24/AMF 30 of VPLMN 14 requesting a set of a set of values for attributes associated with the current location of mobile device 12. In the scenario in which the non-preferred VPLMN 14 is an LTE network, attribute values associated with the current location of mobile device 12 can be requested using an Insert Subscriber Data Request (IDR) having an EPS Location Information Request flag, as depicted in FIG. 2. VPLMN 14 is configured to reply to the IDR with an Insert Subscriber Data Answer (IDA) message having a set of attribute values corresponding to the current geographic location of the mobile device. The set of attribute values reported by VPLMN 14 can be used to determine whether mobile device 12 is within the coverage area of the preferred network 34 in the manner described below.

Figure 3:
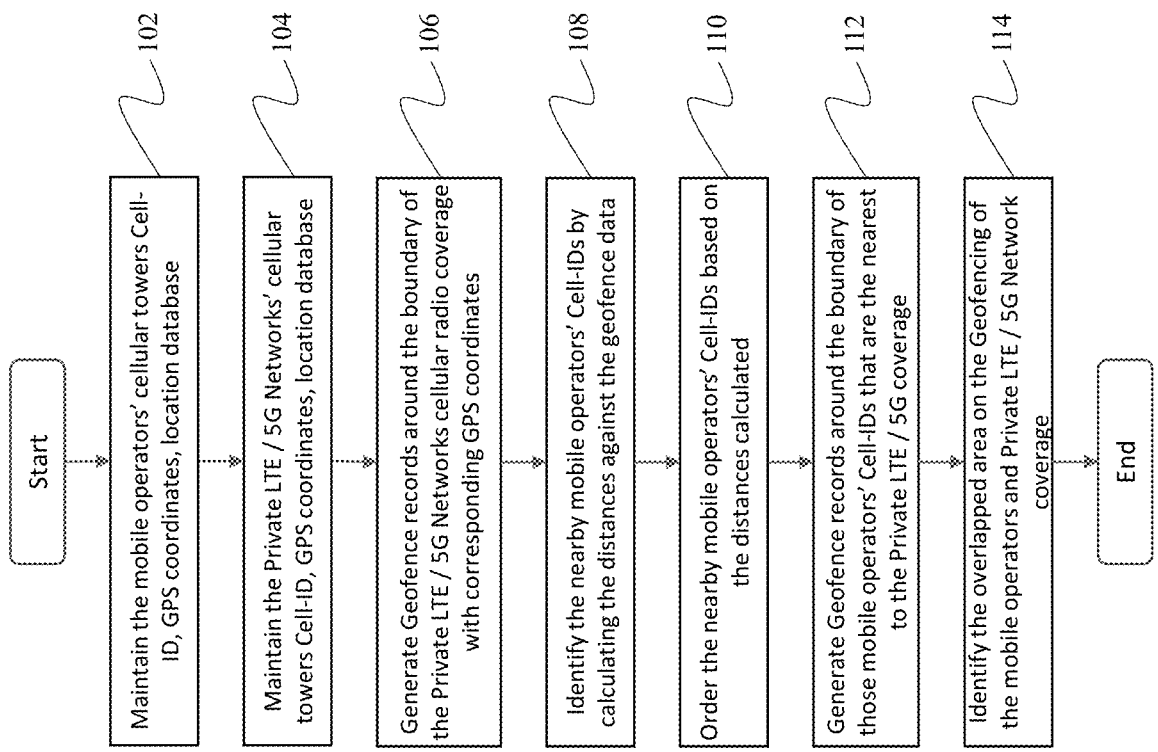
FIG. 3 is a flowchart depicting exemplary steps for identifying an overlapping coverage area of the non-preferred VPLMN and Private LTE/5G network coverage.

FIG. 3 provides a flowchart outlining exemplary steps for identifying geographic areas having overlapping coverage of non-preferred VPLMN 14 and preferred network 34. In step 102, NSE 54 can be configured to maintain Cell-IDs of cellular towers, GPS coordinates, and location database for various non-preferred VPLMNs 14. In step 104, NSE 54 can be configured to maintain the cellular towers Cell-IDs, GPS coordinates, and location database for various preferred networks 34. In step 106, using these values, NSE 54 can generate geofence records around the boundary of preferred network 34 cellular radio coverage with corresponding GPS coordinates. In step 108, NSE 54 identifies nearby VPLMN 14 Cell-IDs by calculating the distances against the geofence data. Next, in step 110, NSE 54 ranks the nearby VPLMN 14 Cell-IDs based on the calculated distances. In step 112, NSE 54 generates geofence records around the boundary of those VPLMN 14 Cell-IDs that are the nearest to the boundaries of network area coverage of a preferred network 34. In step 114, NSE 54 identifies the overlapped area on the geofencing of VPLMN 14 and network coverage area of a preferred network 34.

FIG. 4 depicts a data model of the Cell-ID database records that can be used to establish the geofencing of VPLMN 14 and preferred network 34 (Private LTE/5G Network) area coverage. As disclosed above and depicted in FIGS. 1A-1C, NSE 54 is hosted on the home-network side and interfaces with HLR 44/HSS 48/UDM 52. NSE 54 leverages the connection between HLR 44/HSS 48/UDM 52 of Home Network 42 and MSC 18/MME 24/AMF 30 of VPLMN 14 to obtain a set of attribute values associated with the current location of mobile device 12. As depicted in FIG. 4, these values may include one or more of the following: a longitude, a latitude, a MCC, MNC, cell identification, adjacent cell information, radio signal quality, and radio signal strength.

Figure 5:
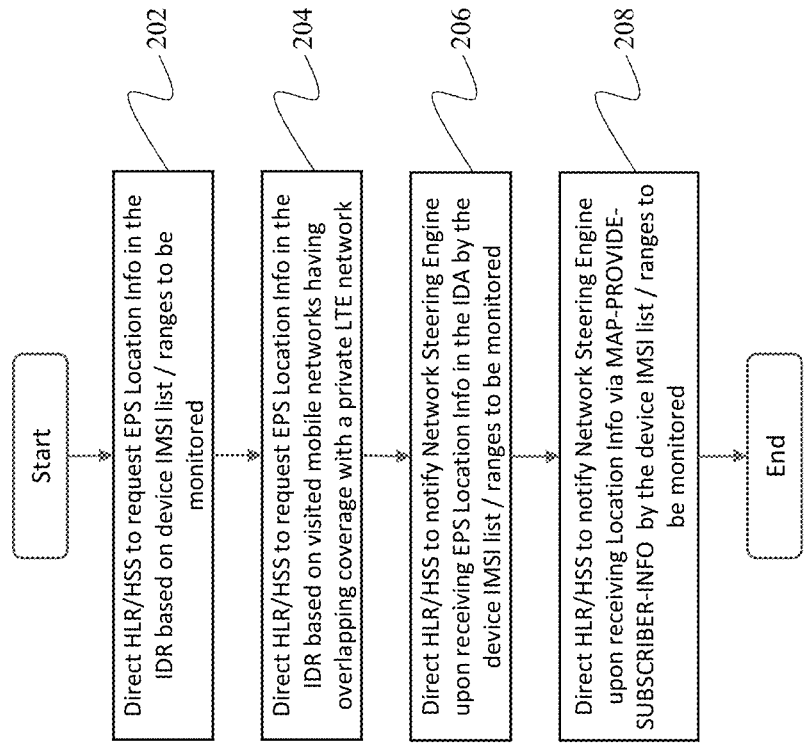
FIG. 5 is a flowchart depicting the steps of configuring a home network according to an embodiment of the invention.

FIG. 5 depicts exemplary steps for receiving the attribute values corresponding to the current location of mobile device 12. In step 202, NSE 54 directs HLR 44/HSS 48 of Home Network 42 to request EPS Location Info in the IDR sent to VPLMN 14 based on IMSI (or IMSI range) associated with mobile device 12. Alternatively, or in addition to, in step 204, NSE 54 can direct Home Network 42 to request EPS Location Info in the IDR when NSE 54 determines that mobile device 12 may be within or approaching a location in which non-preferred VPLMN 14 has coverage overlap coverage with a preferred network 34 (Private LTE/5G Network). Next, in step 206, HLR 44/HSS 48 of Home Network 42 notifies NSE 54 upon receiving EPS Location Info in the IDA. Alternatively, or in addition to, in step 208, NSE 54 can be configured to receive Location Info associated with the current location of mobile device 12 via MAP-PROVIDE-SUBSCRIBER-INFO message, in case VPLMN 14 is a 3G network.

Figure 6:
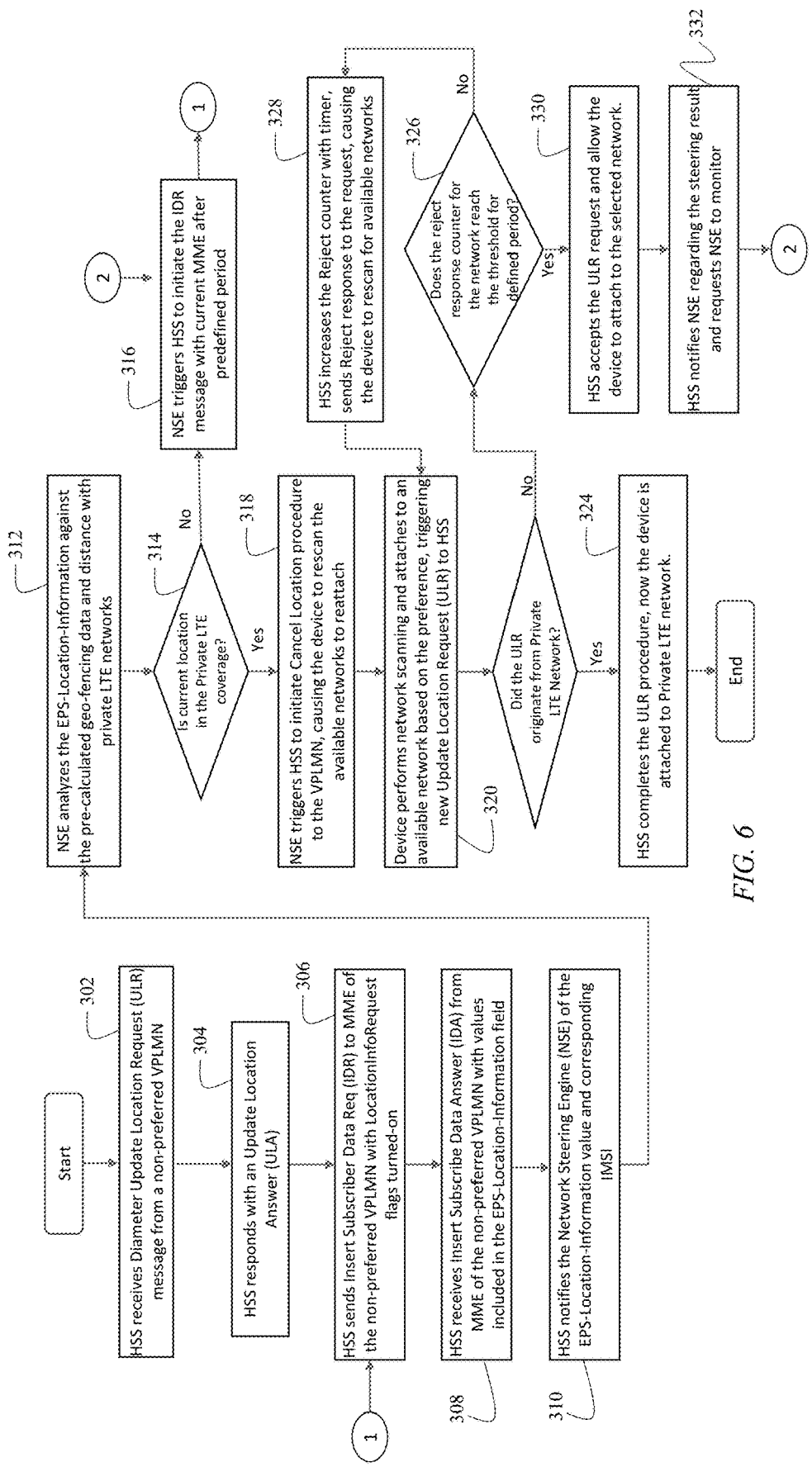
FIG. 6 is a flowchart depicting the steps of a steering procedure according to an embodiment of the invention.

FIG. 6 depicts the steps of a steering procedure for mobile device 12 roaming in non-preferred VPLMN 14, which is a public LTE network (this scenario is depicted in FIG. 1B). The method begins with step 302, in which HHS 48 of Home Network 42 receives a Diameter Update Location Request (ULR) message from VPLMN 14. In step 304, HSS 48 responds with a Update Location Answer (ULA) message. Next, in step 306, HSS 48 sends an Insert Subscriber Data Request (IDR) message to MME 24 of VPLMN 14. The IDR message has an EPS Location Info Request flag turned on. In step 308, HSS 48 receives Insert Subscriber Data Answer (IDA) from MME 24 of VPLMN 14. The IDA includes a set of values in the EPS-Location-Information field.

Next, in step 310, HSS 48 notifies NSE 54 of the EPS-Location-Information values and corresponding IMSI of mobile device 12. In step 312, NSE 54 compares the EPS-Location-Information against the precalculated geofencing data and distance with preferred network 34. In step 314, based on this analysis, NSE 54 determines whether the current location of mobile device 12 is within the coverage area of preferred network 34. If the mobile device is outside of the coverage area of preferred network 34, NSE 54 will trigger HSS 48 to initiate another IDR message to MME 24 of VPLMN 14 after a predefined time period lapses.

However, if NSE 54 determines that mobile device 12 is within the coverage area of preferred network 34, the method proceeds to step 318. In step 318, NSE 54 triggers HSS 48 to initiate Cancel Location procedure to VPLMN 14. This command causes VPLMN 14 to drop network connection with mobile device 12. In step 320, after being detached from non-preferred VPLMN 14, mobile device 12 performs network scanning procedure to identify an available network to which mobile device 12 can reattach based on a predefined list of preferred networks. Mobile device 12 performs network scanning and attaches to an available network based on the preference list, thus triggering a new ULR from MME 38 of preferred network 34 to HSS 48 of Home Network 42.

In step 322, NSE 54 determines whether the new ULR originated from preferred network 34. If so, then in step 324, HSS 48 completes the ULR procedure. At this point mobile device 12 has been successfully steered to a preferred network 34 from a non-preferred VPLMN 14.

Otherwise, if the new ULR originated from another or the same non-preferred VPLMN 14, the method proceeds to step 326. In step 326, it will be determined whether the reject response counter for the network has reached the threshold for a predefined time period—meaning that mobile device 12 has attempted to reattach to the non-preferred VPLMN 14 multiple times. If the threshold number of reattach attempts has not yet been reached, in step 328, HSS 48 increases the reject counter and sends a reject response to the new ULR, thereby causing mobile device to again rescan for available networks.

Otherwise, if the number of the network attach attempts has reached the predefined threshold, HSS 588 will accept the ULR request in step 330, even if that request originated from a non-preferred VPLMN 14. In these circumstances, the Private LTE/5G network services of preferred network 34 may not be available and, therefore, mobile device 12 will be allowed to attach to non-preferred VPLMN 14 to avoid service interruption. In step 332, HSS 48 will notify NSE 54 of the unsuccessful steering result. NSE 54 will continue to monitor for a next suitable opportunity to request an updated set of value attributes associated with the updated location of mobile device 12.

Figure 7:
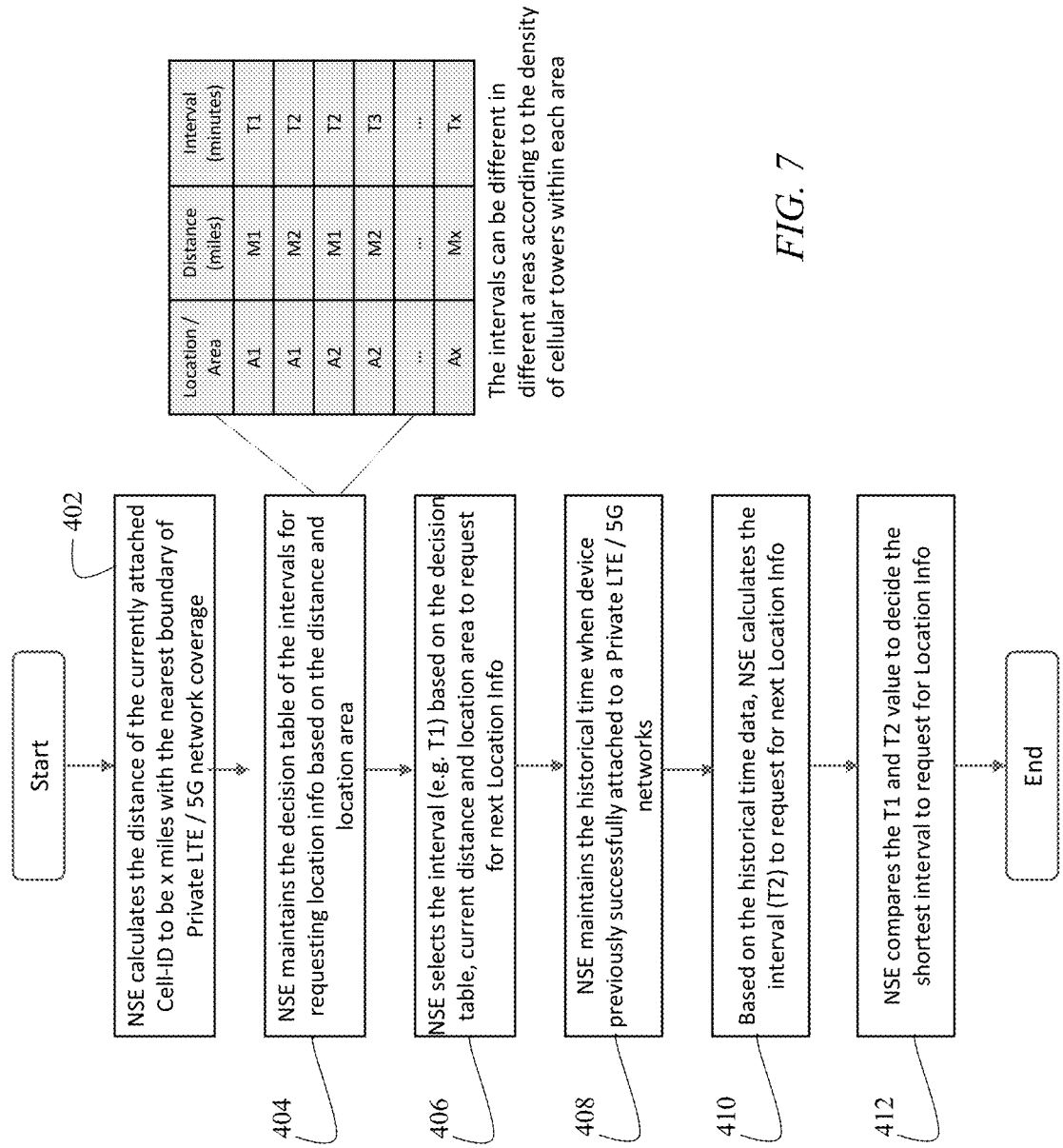
FIG. 7 is a flowchart depicting the steps of determining a time at which to request updated location attribute values for the new location of the mobile device.

FIG. 7 depicts exemplary steps for determining when the location information is to be requested from non-preferred VPLMN 14 while mobile device 12 is attached thereto. In step 402, NSE 54 calculates the distance between the current attached Cell-ID and the nearest boundary of network coverage of preferred network 34. In step 404, NSE 54 maintains the decision table of the intervals for requesting location information of mobile device 12 from VPLMN 14. The time intervals can be based on the distance to the nearest boundary of a preferred network 34 and the current location area of mobile device 12. In step 406, NSE 54 selects a time interval (e.g. T1) for the next request for Location Information via an IDR message. The time intervals can be different in different geographic areas according to the density of cellular towers within each area. In step 408, NSE 54 can also maintain the historical time information regarding the time when mobile device 12 has successfully attached to preferred network 34 in the past. In step 410, NSE 54 calculates the time interval (T2) to request for next location information based on the historic behavior of mobile device 12. In step 412, NSE 54 compares the T1 and T2 values and selects the earliest of the two as the time for triggering the next request for location information from VPLMN 14.

Figure 8:
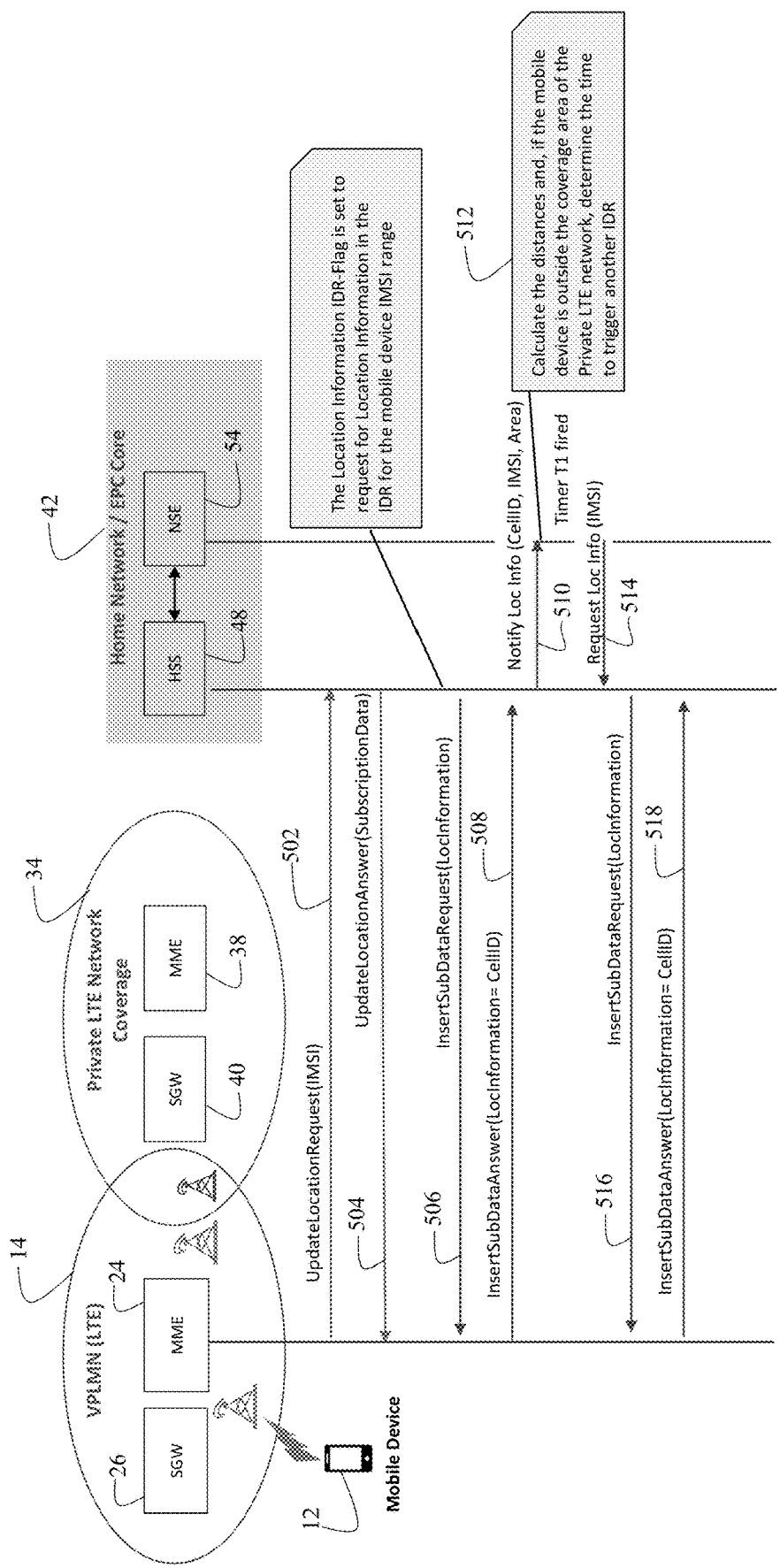
FIG. 8 is a signaling flow diagram depicting the message flow for the scenario in which the mobile device is attached to a non-preferred LTE network and is outside of the geographic region where a Private LTE network has overlapping coverage.
Figure 9:
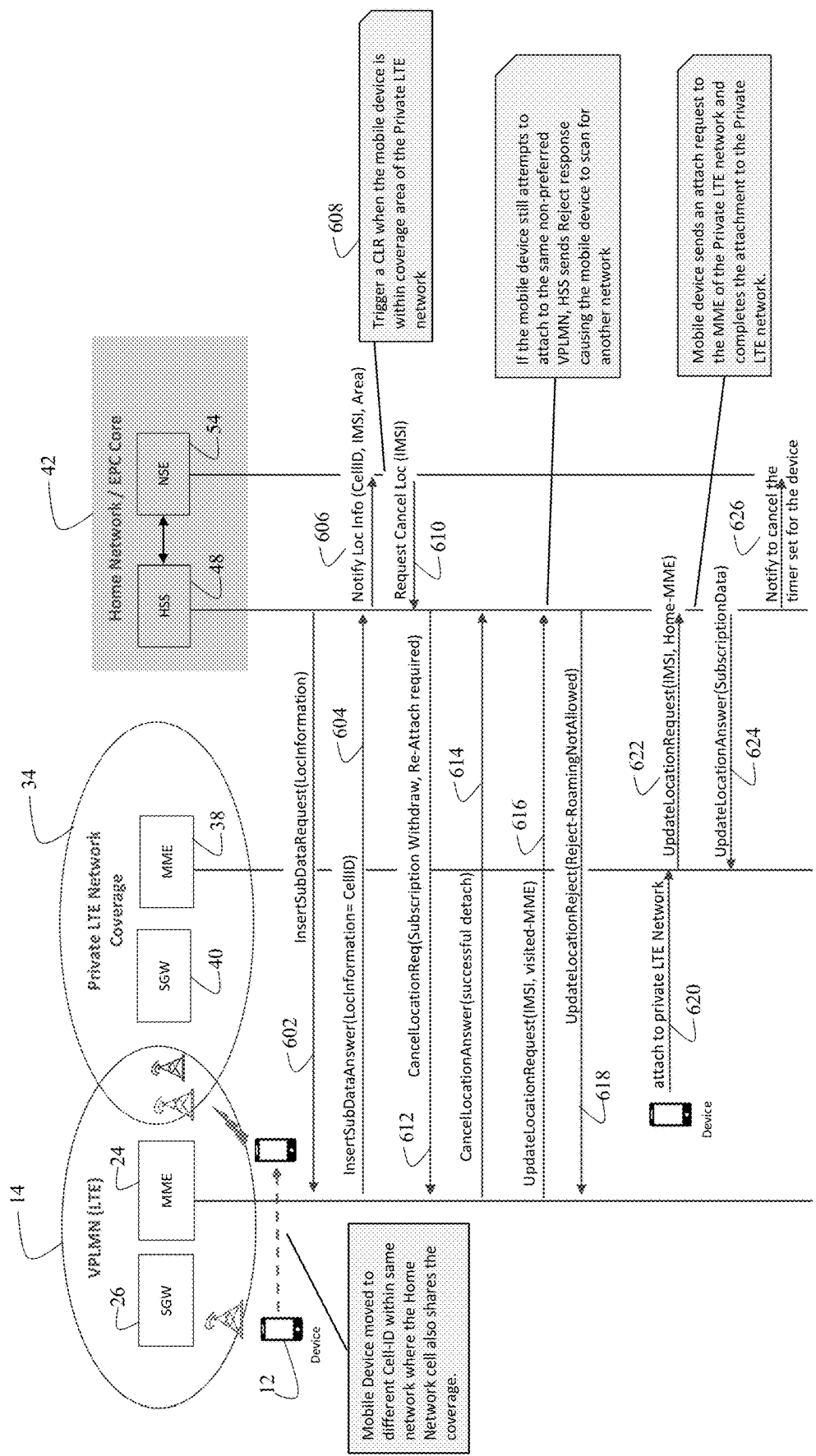
FIG. 9 is a signaling flow diagram depicting the message flow for the scenario in which the mobile device moves from an area covered exclusively by a non-preferred LTE network into a location in which both the non-preferred LTE network and the preferred Private LTE network have overlapping coverage, and the steering application steers the mobile device toward the preferred Private LTE network.
Figure 10:
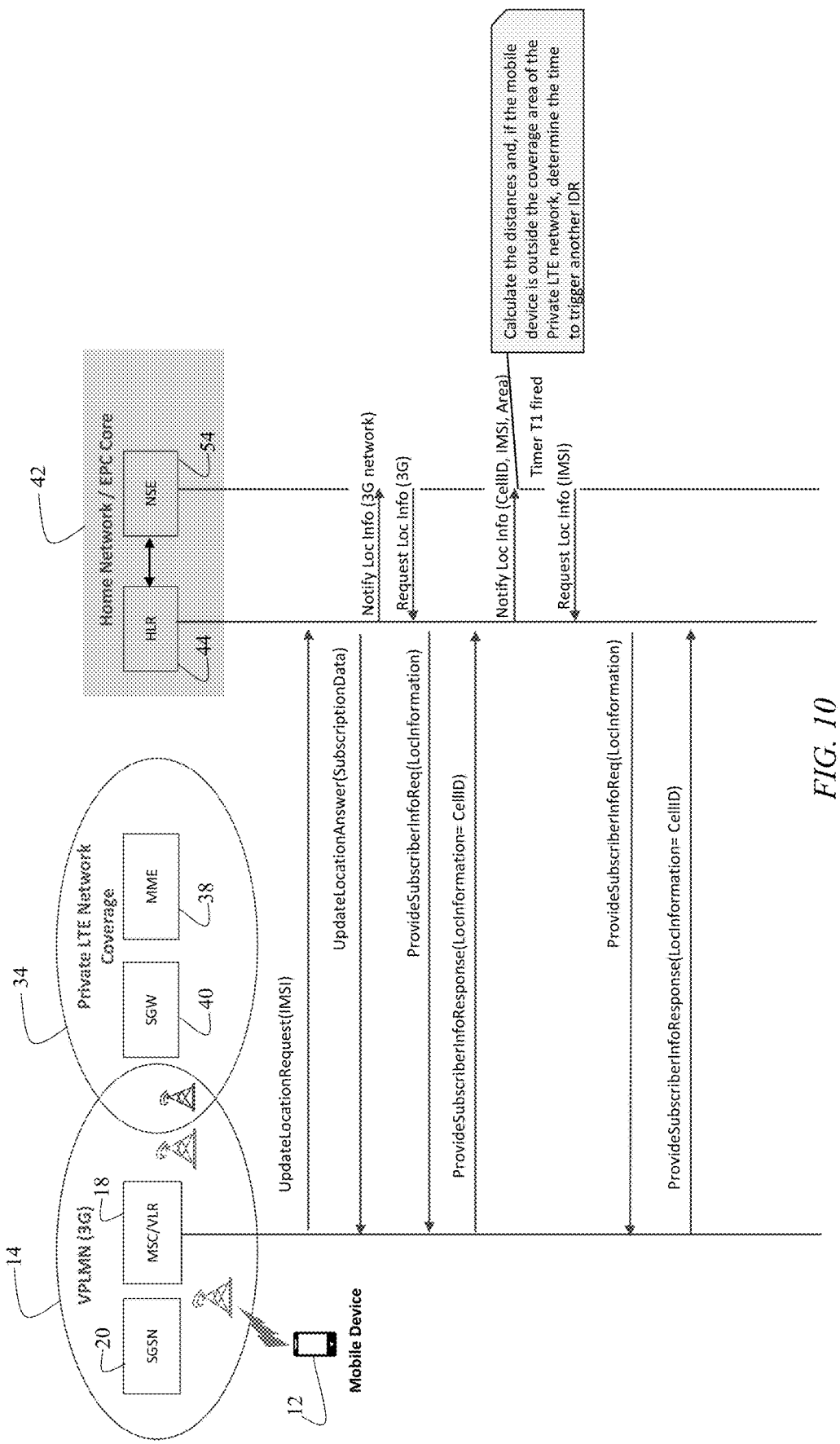
FIG. 10 is a signaling flow diagram depicting the message flow for the scenario in which the mobile device is attached to a non-preferred 3G network and is outside of the geographic region where a Private LTE network has overlapping coverage.

FIGS. 8-10 provide exemplary signaling flow diagrams for a scenario in which non-preferred VPLMN 14 is an LTE network, preferred network 34 is a Private LTE Network, and Home Network 42 is also an LTE network. Initially, mobile device 12 is positioned at a location that only has coverage area of non-preferred VPLMN 14. In step 502, mobile device 12 requests to attach to VPLMN 14, and MME 24 of VPLMN 14 sends a ULR to HSS 48 of Home Network 42. In step 504, HSS 48 responds to MME 24 with a ULA message. In step 506, HSS 48 sends an IDR with EPS Location Information Request flag to MME 24. In step 508, MME 24 responds to HSS 48 with an IDA, which includes a set of values for attributes associated with the current location of mobile device 12. In step 510, HSS 48 sends these attribute values to NSE 54.

In step 512, NSE 54 determines whether preferred network 34 has coverage in the geographic area in which mobile device 12 is currently located. If NSE 54 determines that the current location of mobile device 12 is not within the coverage area of preferred network 34, then NSE 54 will calculate a distance to the nearest location in which preferred network 34 has coverage and will set a timer for time T1, at which mobile device 12 is expected to arrive into a location in which preferred network 34 has coverage. In step 514, upon expiration of the timer T1, NSE 54 triggers a request for Location Information to HSS 48. In step 516, HSS 48 sends another IDR with EPS Location Information Request flag to MME 24, and, in step 518 MME 24 responds with an IDA having updated values for attributes associated with the new current location of mobile device 12. This process is repeated until NSE 54 determines that mobile device 12 has entered coverage area of a preferred network 34.

FIG. 9 depicts that mobile device 12 has moved to a location in which non-preferred VPLMN 14 and preferred network 34 have overlapping coverage areas. Initially, mobile device 12 is attached to VPLMN 14. In step 602, HSS 48 sends an IDR with EPS Location Information Request flag to MME 24. In step 604, MME 24 responds with an IDA message, which includes a set of values for attributes associated with the current location of mobile device 12. In step 606, HSS 48 sends these values to NSE 54. In step 608, NSE 54 determines that mobile device 12 is within the coverage area of preferred network 34 and, therefore, a Cancel Location Request (CLR) to VPLMN 14 should be triggered. In step 610, NSE 54 sends a command to HSS 48 to send a CLR to MME 24. In step 612, HSS 48 sends a CLR message to MME 24, causing non-preferred VPLMN 14 to detach mobile device 12 from its network. In step 614, MME 24 sends a Cancel Location Answer (CLA) to HSS 48.

At this point, mobile device 12 will begin to scan for an available network to become attached to. If mobile device 12 attempts to reconnect to non-preferred VPLMN 14, MME 24 will send a ULR message to HSS 48 in step 616. HSS 48 is configured to deny this request and, in step 618, HSS 48 will respond to MME 24 with an Update Location Reject message. Mobile device 12 will continue to try to attach to another available network.

In step 620, mobile device 12 attaches to preferred network 34. In step 622, MME 38 of preferred network 34 sends a ULR message to HSS 48. HSS 48 will determine that the ULR came from preferred network 34 and will respond with a ULA message in step 624. At this point, mobile device 12 has been successfully steered to preferred network 34. In step 626, HSS 48 will notify NSE 54 to cancel any remaining timers for requesting location information of mobile device 12.

Figure 11:
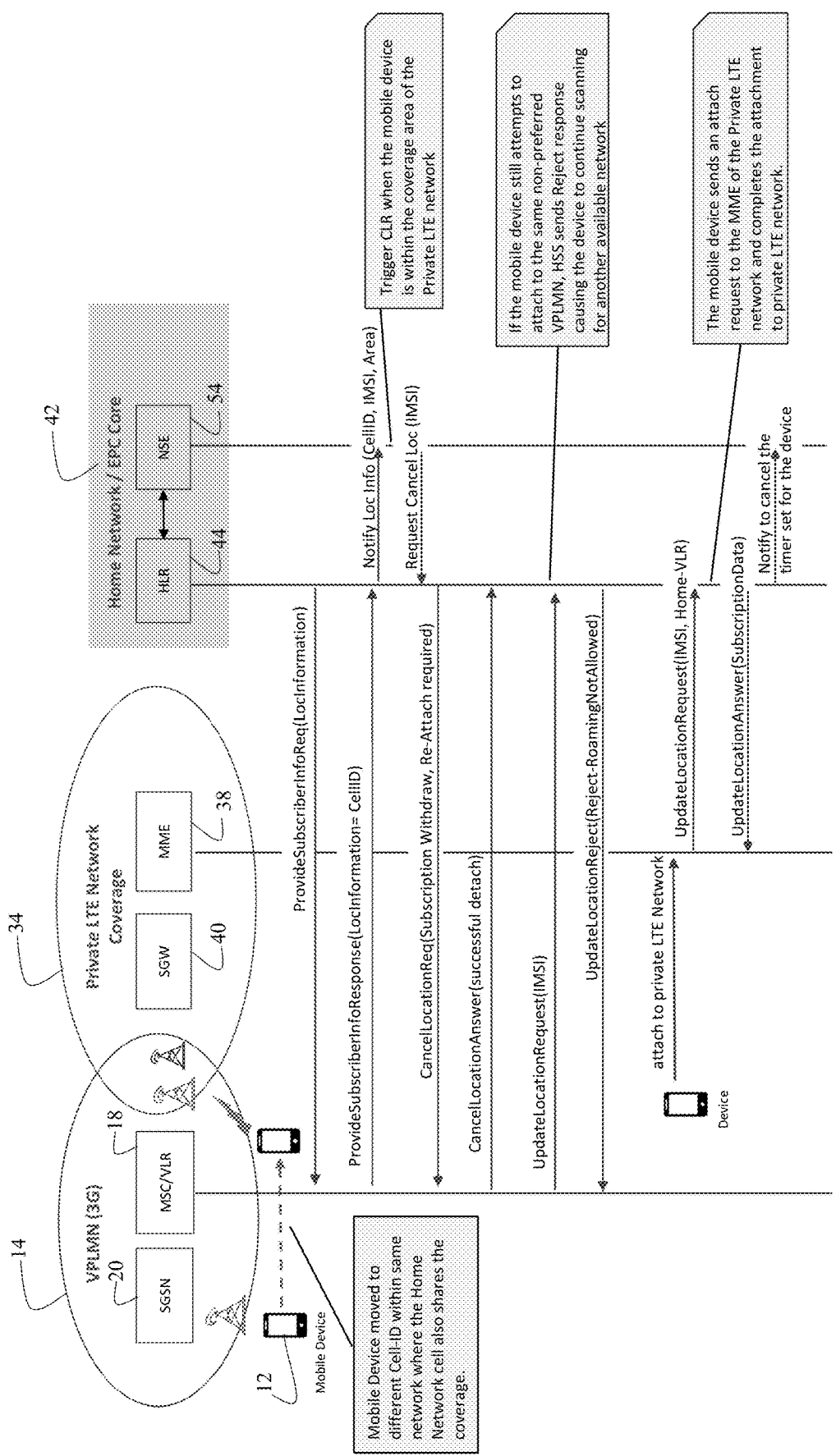
FIG. 11 is a signaling flow diagram depicting the message flow for the scenario in which the mobile device moves from an area covered exclusively by a non-preferred 3G network into a location in which both the non-preferred 3G network and the preferred Private LTE network have overlapping coverage, and the steering application steers the mobile device toward the preferred Private LTE network.
Figure 12:
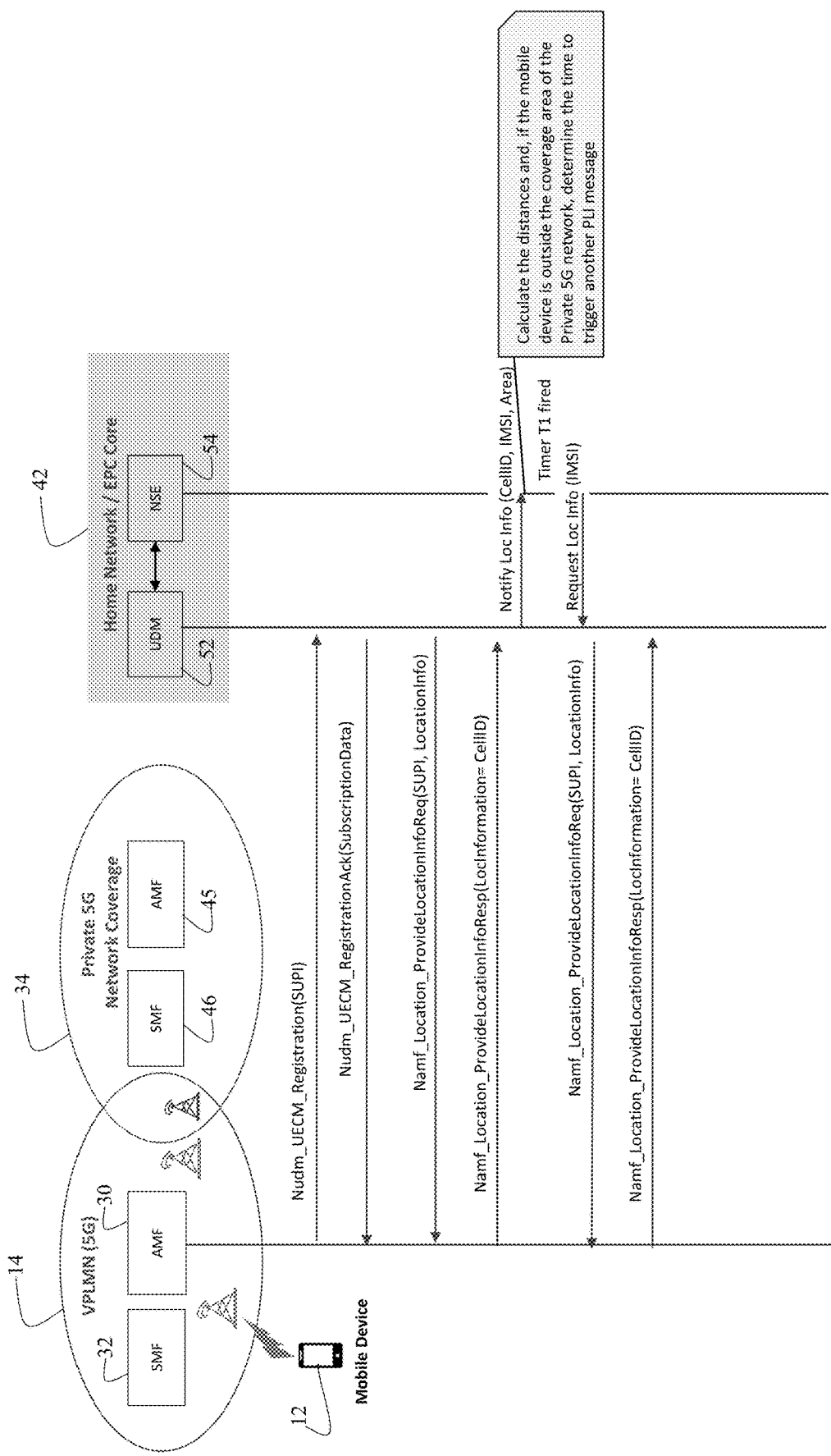
FIG. 12 is a signaling flow diagram depicting the message flow for the scenario in which the mobile device is attached to a non-preferred public 5G network and is outside of the geographic region where a Private 5G network has overlapping coverage.
Figure 13:
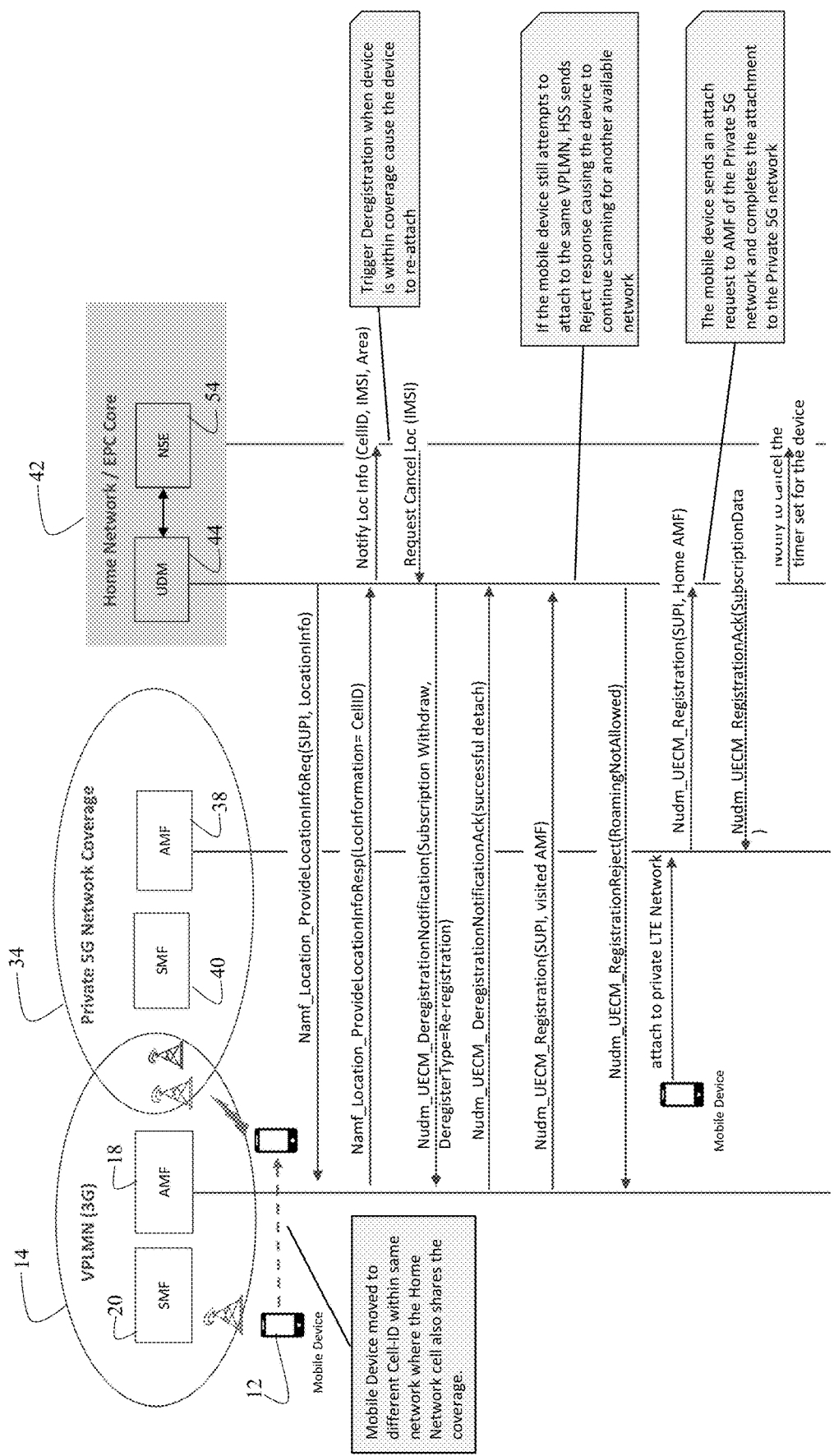
FIG. 13 is a signaling flow diagram depicting the message flow for the scenario in which the mobile device moves from an area covered exclusively by a non-preferred public 5G network into a location in which both the non-preferred 5G network and the preferred Private 5G network have overlapping coverage, and the steering application steers the mobile device toward the preferred Private 5G network.

FIGS. 10-11 depict signaling diagrams for a scenario in which non-preferred VPLMN 14 is a 3G network, preferred network 34 is a Private LTE Network, and Home Network 42 is a 3G network. FIGS. 12-13 depict signaling diagrams for a scenario in which non-preferred VPLMN 14 is a 5G network, preferred network 34 is a Private 5G Network, and Home Network 42 is also a 5G network. The signaling flows for all three scenarios are analogous, although message types exchanged between VPLMN 14, Home Network 42, and preferred network 34 are different. In FIGS. 10-11, Home Network 42 obtains values associated with location of mobile device 12 by sending a MAP Provide Subscriber Info Request message to MSC 18 of VPLMN 14 and receiving a MAP Provide Subscriber Info Response message from MSC 18 of VPLMN 14 containing a set of values for attributes associated with the current location of mobile device 12.

In FIGS. 12-13, UDM 52 of Home Network 42 accomplishes the task of obtaining attribute values associated with the current location of mobile device 12 by sending Namf Provide Location Info Request message to AMF 30 of VPLMN 14 and receiving Namf Provide Location Response therefrom. To direct VPLMN 14 to detach mobile device 12 when mobile device 12 arrives to a location in which preferred network 34 has coverage, UDM 52 of Home Network 42 sends Nudm UECM Deregistration Notification to AMF 30 of VPLMN 14. Finally, when mobile device 12 attaches to preferred network 34, AMF 45 of preferred network 34 sends Nudm UECM Registration message to UDM 52, to which UDM 52 responds with Nudm UECM Registration Acknowledgement message. Although, scenarios depicted in FIGS. 8-9, 10-11, and 12-13 pertain to different network types, the method of steering mobile device 12 from non-preferred VPLMN 14 to preferred network 34 remains fundamentally unchanged.

| Definitions | | |
|---|---|---|
| Name | Expansion | Definition/Description |
| MME | Mobile Management Entity | Unique server in each Mobile Network(4G) to keep track of Mobile device and periodically updates HSS |
| MSC | Mobile-Services Switching Center | Mobile-Switching Service Center - Unique Server in each Mobile network (2G/3G) to keep track of device location and updates HLR/HSS. |
| SGSN | Serving GPRS Support Node | Serving Data Support Node in the cellular network to keep track of device location for data service. |
| PGW | Packet Data Network(PDN) Gateway | PGW interfaces the mobile device to external PDN networks for Data service. |
| HLR/HSS | Home Location Register/Home Subscriber System | HLR/HSS contains Subscriber information with subscription Data and MME that is currently serving the Mobile device |
| UDM | Unified Data Management | UDM manages the device subscription profile similar to HLR/HSS |
| AMF | Access and Mobility | Interfaces device with UDM |

-continued

| Name | Expansion | Definition/Description |
| --- | --- | --- |
| | Management function | |
| SMF | Session Management Function | Performs Data session control function |
| UPF | User Plane Function | Interfaces device to Data networks at User plane (similar to PGW in LTE) |
| Location Information - LA | Location Information - Location Area | Location Information - Location Area - Location area covered by MME/MSC within Mobile Network |
| Location Information - GCI | Location Information - Global Cell-Id | Global Cell Id (MCCMNC + LAC + CI) - Uniquely identifies each cell of Mobile Network operator |

Hardware and Software Infrastructure Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of steering a mobile device to a preferred telecommunications network having a geographical coverage area overlapping with a non-preferred Visited Public Land Mobile Network (VPLMN), wherein the mobile device is initially attached to the non-referred VPLMN, the method comprising:

sending a first message to the non-preferred VPLMN, the first message including a request for a current location of the mobile device;

receiving from the non-preferred VPLMN a first response to the first message, the first response having a first attribute values associated with the current location of the mobile device;

accessing a set of prestored attribute values defining the geographical coverage area of the preferred network;

comparing the first attribute values associated with the current location of the mobile device received from the non-preferred VPLMN against the set of prestored attribute values to determine whether the current location of the mobile device is within the geographical coverage area of the preferred telecommunications network;

responsive to determining that the current location of the mobile device is outside the geographical coverage area of the preferred telecommunications network, calculating an expected time of arrival of the mobile device into the geographical coverage area of the preferred telecommunications network;

sending, based on the expected time of arrival, a second message to the non-preferred VPLMN requesting a second attribute value associated with an updated location of the mobile device; and responsive to determining that the updated location of the mobile device is within the geographical coverage area of the preferred telecommunications network, sending a first command to the non-preferred VPLMN directing the non-preferred VPLMN to discontinue attachment of the mobile device thereto;

wherein, responsive to the mobile device becoming detached from the non-preferred VPLMN, the mobile device is configured to perform a network selection procedure, thereby requesting to attach to the preferred telecommunication network.

2. The method of claim 1, wherein the first message, the first command, or both are sent from a Home Public Land Mobile Network (HPLMN) associated with the mobile device.

3. The method of claim 2, wherein the first message is sent from a network node selected from a group consisting of a Home Location Register (HLR), a Home Subscriber Server (HSS), and a Unified Data Management (UDM) node.

4. The method of claim 2, wherein the first message is triggered by a steering application hosted at the HPLMN.

5. The method of claim 2, wherein a steering application hosted at the HPLMN determines whether the current location of the mobile device is within the geographical coverage area of the preferred telecommunications network.

6. The method of claim 2, wherein the first command is triggered by a steering application hosted at the HPLMN.

7. The method of claim 1, wherein the first message is an Insert Subscriber Data Request (IDR) message, a Provide Subscriber Information request message, or a Namf_Location Service message.

8. The method of claim 1, wherein the first command is a Mobile Application Part (MAP) Cancel-Location message, a Diameter Cancel-Location-Request, or a Nudm Deregistration Notification message.

9. The method of claim 1, wherein the first attribute values associated with the current location of the mobile device is selected from a group consisting of a longitude, a latitude, a mobile country code (MCC), a mobile network code (MNC), a cell identification, an adjacent cell information, a radio signal quality, and a radio signal strength.

10. The method of claim 1, wherein the preferred telecommunications network is a 5G network, a private 5G network, or a private Long-Term Evolution (LTE) network.

11. The method of claim 1, wherein the first attribute values associated with the current location of the mobile device is received via a Signaling System No. 7 (SS7) protocol, a Diameter protocol, a General Packet Radio Service Tunneling Protocol (GTP), a Hypertext Transfer Protocol/2 (HTTP/2), or Transmission Control Protocol/Internet Protocol (TCP/IP).

12. The method of claim 1, wherein the mobile device is provisioned with a list of preferred telecommunications networks, and wherein responsive to the mobile device being detached from the non-preferred VPLMN, the mobile device is configured to perform a network selection procedure based on the list of preferred telecommunications networks.

13. The method of claim 1, wherein the first message is an Insert Subscriber Data Request (IDR) message, a Provide Subscriber Information request message, or a Namf_Location Service message.

14. The method of claim 1, wherein the first command is a Mobile Application Part (MAP) Cancel-Location message, a Diameter Cancel-Location-Request, or a Nudm Deregistration Notification message.

15. The method of claim 1, wherein the first attribute values associated with the current location of the mobile device is selected from a group consisting of a longitude, a latitude, a mobile country code (MCC), a mobile network code (MNC), a cell identification, an adjacent cell information, a radio signal quality, and a radio signal strength.

16. The method of claim 1, wherein the preferred telecommunications network is a 5G network, a private 5G network, or a private Long-Term Evolution (LTE) network.

17. A method of steering a mobile device to a preferred telecommunications network having a geographical coverage area overlapping with a non-preferred Visited Public Land Mobile Network (VPLMN), wherein the mobile device is initially attached to the non-referred VPLMN, the method comprising:
providing a steering application hosted on a Home Public Land Mobile Network (HPLMN) associated with the mobile device;
triggering, by the steering application, the HPLMN to send a first message to the non-preferred VPLMN, the first message including a request for a current location of the mobile device;
receiving from the non-preferred VPLMN a first response to the first message, the first response having a first attribute values associated with the current location of the mobile device;
accessing a set of prestored attribute values defining the geographical coverage area of the preferred network;
comparing, by the steering application, the first attribute values associated with the current location of the mobile device received from the non-preferred VPLMN against the set of prestored attribute values to determine whether the current location of the mobile device is within the geographical coverage area of the preferred telecommunications network;
responsive to determining that the current location of the mobile device is outside the geographical coverage area of the preferred telecommunications network, calculating an expected time of arrival of the mobile device into the geographical coverage area of the preferred telecommunications network;
triggering, based on the expected time of arrival, the HPLMN to send a second message to the non-preferred VPLMN requesting a second attribute value associated with an updated location of the mobile device; and
responsive to determining that the updated location of the mobile device is within the geographical coverage area of the preferred telecommunications network, triggering, by the steering application, the HPLMN to send a first command to the non-preferred VPLMN, wherein the first command directs the non-preferred VPLMN to discontinue attachment of the mobile device thereto;
wherein, responsive to the mobile device becoming detached from the non-preferred VPLMN, the mobile device is configured to perform a network selection procedure, thereby requesting to attach to the preferred telecommunication network.

18. The method of claim 17, wherein the first message is sent from a network node selected from a group consisting of a Home Location Register (HLR), a Home Subscriber Server (HSS), and a Unified Data Management (UDM) node.

* * * * *